(12) United States Patent
Morimoto

(10) Patent No.: US 6,247,013 B1
(45) Date of Patent: Jun. 12, 2001

(54) HYPER TEXT READING SYSTEM

(75) Inventor: Osamu Morimoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/104,445

(22) Filed: Jun. 25, 1998

(30) Foreign Application Priority Data

Jun. 30, 1997 (JP) .................................................. 9-187212

(51) Int. Cl.[7] .................................................. G06F 17/30
(52) U.S. Cl. .................................. 707/10; 707/9; 707/10; 707/101; 707/104; 707/500; 707/513; 709/317; 345/302
(58) Field of Search .................................. 707/9, 10, 1, 8, 707/101, 104, 500, 513; 709/6, 200, 203, 229, 225, 218, 317; 713/201; 706/45, 47; 711/202; 345/302

(56) References Cited

U.S. PATENT DOCUMENTS

| | | | |
|---|---|---|---|
| 5,692,213 | * 11/1997 | Goldberg et al. | 345/302 |
| 5,835,722 | * 11/1998 | Bradshaw et al. | 709/225 |
| 5,887,171 | * 3/1999 | Tada et al. | 709/317 |
| 5,913,215 | * 6/1999 | Rubinstein et al. | 707/10 |
| 5,918,223 | * 6/1999 | Blum et al. | 707/1 |
| 5,983,267 | * 11/1999 | Shklar et al. | 709/217 |
| 6,055,538 | * 4/2000 | Kessenich et al. | 707/101 |

OTHER PUBLICATIONS

Chakrabarti, S. et al., "Mining the Web's link structure", Computer, vol. 32, Issue: 8, Aug. 1999, pp. 60–67.*

Kao, B.C.M. et al., "Recommending anchor points in structure–preserving hypertext document retrieval", Proceedings of the Twenty–Second Annual International Computer Software and Applications Conference, 1998. COMPSAC '98., Aug. 1–21, 1998, pp 582–587.*

Montesi, D. et al., "Similarity search through fuzzy relational algebra", Proceedings of the Tenth International Workshop on Database and Expert Systems Applications, Sep. 1–3, 1999, pp. 235–239.*

Oliver, Dick et al., "Netscape Unleashed", Sams.net Publishing, Feb. 1996.*

Swain, M.J., "Searching for multimedia on the World Wide Web", IEEE International Conference on Multimedia Computing and Systems, Jun. 7–11, 1999, vol. 1, pp. 32–37.*

Wu, Yi–Hung et al., "Idex structures of user profiles for efficient web page filtering services", Proceedings of the 20th International Conference on Distributed Computing Systems, Apr. 10–13, 2000, pp. 644–651.*

Dokko, She–Joon et al., "Development of Multimedia E–mail System Providing an Integrated Message View", High Performance Computing on the Information Superhighway, 1997, HPC Asia '97, Apr. 28—May 2, 1997, pp. 494–498.*

Hitara, Kyoji et al., "Media–based Navigation for Hypermedia Systems", Proceedings of the Fifth ACM Conference on Hypertext and Hypermedia, Nov. 14–18, 1993, pp. 159–173.*

Lincoln, Janet E. et al., "Displaying scientific graphics on computer", IEEE Transaction on Professional Communication, vol. 40, No. 2, Jun. 1997, pp. 78–91.*

McEneaney, John E., "Are Less Able Reader Disadvantage by Reading in Electronic Environments?", Proceedings of the 1998 IEEE International Symposium on Technology and Society, Jun. 12–13, 1998, pp. 28–32.*

* cited by examiner

Primary Examiner—Hosain T. Alam
Assistant Examiner—Shahid Alam
(74) Attorney, Agent, or Firm—Fitzpatrick, Cella, Harper & Scinto

(57) ABSTRACT

A hyper text reading system which assures an advantage by protecting the right of a contents provider. A link source confirmation unit confirms a link source of an anchor included in a hyper text. The link source is provided between a WWW browser and a helper application, thereby enabling contents data to be referred from only the anchor included in the hyper text prepared by the contents provider.

24 Claims, 8 Drawing Sheets

HYPER TEXT READING SYSTEM

BACKGROUND OF THE INVENTION

1. Field of the Invention

The invention relates to a hyper text reading system for providing and reading hyper text on a network.

2. Related Background Art

Generally, a technique for the purpose of adding a detailed description or related information for a document or wordings of a document, which is linked to another document or data is known. Such a linked document or data is called a hyper text. As a link destination from the hyper text, in addition to a hyper text and an ordinary text, multimedia data such as image, audio, video, or the like can also be designated.

Various WWW browsers are known as means for presenting (displaying) information of a hyper text on WWW (World Wide Web) of the internet.

Those WWW browsers have a function to present (display) the hyper text selected by the user from WWW servers existing on the internet. The WWW browser usually has a function to present (display) still image data besides a text document and the like.

A spot linked to another document or data existing in the hyper text is called an anchor. When the user clicks the anchor by a mouse button or the like, the WWW browser has a function to download a document or data on the link destination side showing the anchor from the relevant WWW server and to present (display) it.

If the data on the link destination side is video data or audio data and the WWW browser itself does not have a function to present them, a method whereby the WWW browser activates an external application in correspondence to a format of the data on the link destination side and the external application presents the information on the link destination side is used. Such an external application is called a helper application or, simply, a helper.

A method called a plug-in such that an extended function of the WWW browser is read out from an external memory device such as a hard disk or the like in correspondence to the data format on the link destination side and the data on the link destination side is displayed in the WWW browser is also known.

FIG. 7 is a diagram showing an example in which the WWW browser operates in cooperation with the helper. In the diagram, a site 701 of a contents provider to be connected exists on the internet 703. A WWW server (computer) 704 and a contents server (computer) 705 are provided in the site 701, respectively. There is considered a case where hyper text information accumulated in the WWW server 704 and video information accumulated in the contents server 705 are displayed by a computer 702 of an information reader through the internet 703.

The contents server which is used here denotes a server in which multimedia data such as video information or audio information has been accumulated. There is also a case where the contents server operates on the same computer as that of the WWW server.

When the computer 702 of the information reader and the WWW server 704 existing in the site 701 of the contents provider are connected via the internet, in step S1, the information reader requests the hyper text information existing in the WWW server 704 by operating a WWW browser 706.

In step S2, the WWW server 704 transmits the hyper text information to the computer 702 of the information reader. The computer 702 of the information reader who received the hyper text information displays a hyper text 708 by the WWW browser 706.

An anchor 709 which is linked to the video information accumulated in the contents server 705 is included in the hyper text 708.

In step S3, when the information reader clicks the anchor 709, the WWW browser 706 knows that the link destination of the anchor 709 is video data.

In this instance, if the WWW browser 706 itself does not have a function to display the video image, the WWW browser 706 automatically activates a helper application 707 in step S4 and notifies the helper application 707 of address (address of the contents server 705) information on the link destination side of the anchor 709.

In step S5, the helper application 707 is subsequently connected to the computer of the contents server 705 in an address on the link destination side notified from the WWW browser 706 in step S4 and transmits a video data request command.

In step S6, when the video data request command is received, the contents server 705 transmits the video data to the helper application 707. The helper application 707 which received the video data presents a contents information 710 in a readable format.

Even in the case where the WWW browser 706 itself does not have the function to present the contents information which is provided by the contents provider, according to the procedure as mentioned above, the helper application 707 is activated and the data can be downloaded and presented.

The foregoing conventional system, however, has the following problems.

That is, as shown in FIG. 8, there is considered a case where an anchor 713 which is linked to the contents information which is provided by the contents provider exists in a hyper text 712 downloaded from a WWW server (computer) 711a existing in a WWW site 711 of a third party which is not concerned with the site 701 of the contents provider.

When the information reader clicks the anchor 713, the WWW browser 706 automatically activates the helper application 707. The helper application 707 downloads the contents data from the contents server 705 of the contents provider and displays the contents information 710 as if the third party provided the information. There is a case of the occurrence of a disadvantage of the contents provider such that the information reader can read the contents data without seeing the hyper text in which a name of the information provider, a product name, remarks in use, and the like have been written which the contents provider inherently wants to present or the like.

SUMMARY OF THE INVENTION

The invention is made in consideration of the problems which the foregoing conventional technique has and it is an object of the invention to provide a hyper text reading system which can protect the right of a contents provider and assure an advantage.

To accomplish the above object, according to an aspect of the invention, there is provided a hyper text reading system in a database system of a client/server type constructed by a server and clients, wherein the server comprises hyper text providing means for providing a hyper text and multimedia data providing means for providing multimedia data, the client comprises hyper text receiving means for receiving a desired hyper text of the user, hyper text display means for displaying the hyper text received by the hyper text receiving means, multimedia data receiving means for receiving the multimedia data from the server when an anchor in the hyper text displayed by the hyper text display means is selected by the user, and multimedia data output means for generating the multimedia data received by the multimedia data receiving means, and the multimedia data receiving means of the client comprises discriminating means for discriminating whether a link source of the anchor selected by the user in the hyper text displayed by the hyper text display means is proper or not and limiting means for limiting the reception of the multimedia data from the server on the basis of a discrimination result by the discriminating means.

To accomplish the above object, according to another aspect of the invention, there is provided a hyper text reading system in a database system of a client/server type comprising a plurality of servers and clients, wherein a first server has hyper text providing means for providing a hyper text, a second server has multimedia data providing means for providing multimedia data, the client comprises hyper text receiving means for receiving a desired hyper text of the user, hyper text display means for displaying the hyper text received by the hyper text receiving means, multimedia data receiving means for receiving the multimedia data from the second server when an anchor in the hyper text displayed by the hyper text display means is selected by the user, and multimedia data output means for generating the multimedia data received by the multimedia data receiving means, and the multimedia data receiving means of the client comprises discriminating means for discriminating whether a link source of the anchor selected by the user in the hyper text displayed by the hyper text display means is proper or not and limiting means for limiting the reception of the multimedia data from the server on the basis of a discrimination result by the discriminating means.

To accomplish the above object, according to still another aspect of the invention, there is provided a hyper text reading apparatus comprising:

hyper text receiving means for receiving a desired hyper text of the user;

hyper text display means for displaying the hyper text received by the hyper text receiving means;

multimedia data receiving means for receiving multimedia data from a server on a link destination side of an anchor in the hyper text displayed by the hyper text display means when the anchor is selected by the user; and multimedia data output means for generating the multimedia data received by the multimedia data receiving means, wherein the multimedia data receiving means has discriminating means for discriminating whether a link source of the anchor selected by the user in the hyper text displayed by the hyper text display means is proper or not and limiting means for limiting the reception of the multimedia data from-the server on the basis of a discrimination result by the discriminating means.

To accomplish the above object, according to further another aspect of the invention, there is provided a hyper text reading apparatus comprising:

hyper text receiving means for receiving a desired hyper text of the user;

hyper text display means for displaying the hyper text received by the hyper text receiving means;

multimedia data receiving means for receiving multimedia data from a server on a link destination side of an anchor when the anchor in the hyper text displayed by the hyper text display means is selected by the user; and multimedia data output means for generating the multimedia data received by the multimedia data receiving means, wherein the multimedia data receiving means has discriminating means for discriminating whether a link source of the anchor selected by the user in the hyper text displayed by the hyper text display means is proper or not and limiting means for limiting the reception of the multimedia data from the server on the basis of a discrimination result by the discriminating means.

To accomplish the above object, according to further another aspect of the invention, there is provided a hyper text reading method comprising:

a hyper text receiving step of receiving a desired hyper text of the user;

a hyper text displaying step of displaying the hyper text received by the hyper text receiving step;

a multimedia data receiving step of receiving multimedia data from a server on a link destination side of an anchor in the hyper text displayed by the hyper text displaying step when the anchor is selected by the user; and a multimedia data outputting step of generating the multimedia data received by the multimedia data receiving step, wherein the multimedia data receiving step has a discriminating step of discriminating whether a link source of the anchor selected by the user in the hyper text displayed by the hyper text displaying step is proper or not and a limiting step of limiting the reception of the multimedia data from the server on the basis of a discrimination result in the discriminating step.

To accomplish the above objects, according to further another aspect of the invention, there is provided a hyper text reading method comprising:

a hyper text receiving step of receiving a desired hyper text of the user;

a hyper text displaying step of displaying the hyper text received by the hyper text receiving step;

a multimedia data receiving step of receiving multimedia data from a server on a link destination side of an anchor in the hyper text displayed in the hyper text displaying step when the anchor is selected by the user, and a multimedia data outputting step of generating the multimedia data received by the multimedia data receiving step, wherein the multimedia data receiving step has a discriminating step of discriminating whether a link source of the anchor selected by the user in the hyper text displayed by the hyper text displaying step is proper or not and a limiting step of limiting the reception of the multimedia data from the server on the basis of a discrimination result in the discriminating step.

To accomplish the above object, according to further another aspect of the invention, there is provided a memory medium in which a computer program comprising:

a hyper text receiving module for receiving a desired hyper text of the user;

a hyper text display module for displaying the received hyper text;

a multimedia data receiving module for receiving multimedia data from a server on a link destination side of an anchor in the displayed hyper text when the anchor is selected by the user; and a multimedia data output module for generating the received multimedia data has been stored, wherein the multimedia data receiving module includes a discriminating module for discriminating whether a link source of the anchor selected by the user in the displayed hyper text is proper or not and a limiting module for limiting the reception of the multimedia data from the server on the basis of a discrimination result.

To accomplish the above object, according to further another aspect of the invention, there is provided a memory medium in which a computer program comprising:

a hyper text receiving module for receiving a desired hyper text of the user;

a hyper text display module for displaying the received hyper text;

a multimedia data receiving module for receiving multimedia data from a server on a link destination side of an anchor in the displayed hyper text when the anchor is selected by the user; and a multimedia data output module for generating the received multimedia data has been stored, wherein the multimedia data receiving module includes a discriminating module for discriminating whether a link source of the anchor selected by the user in the displayed hyper text is proper or not and a limiting module for limiting the reception of the multimedia data from the server on the basis of a discrimination result.

DETAILED DESCRIPTION OF THE PREFERRED EMBODIMENTS

Each embodiment of the invention will now be described hereinbelow with reference to FIGS. 1 to 6.

Figure 1:
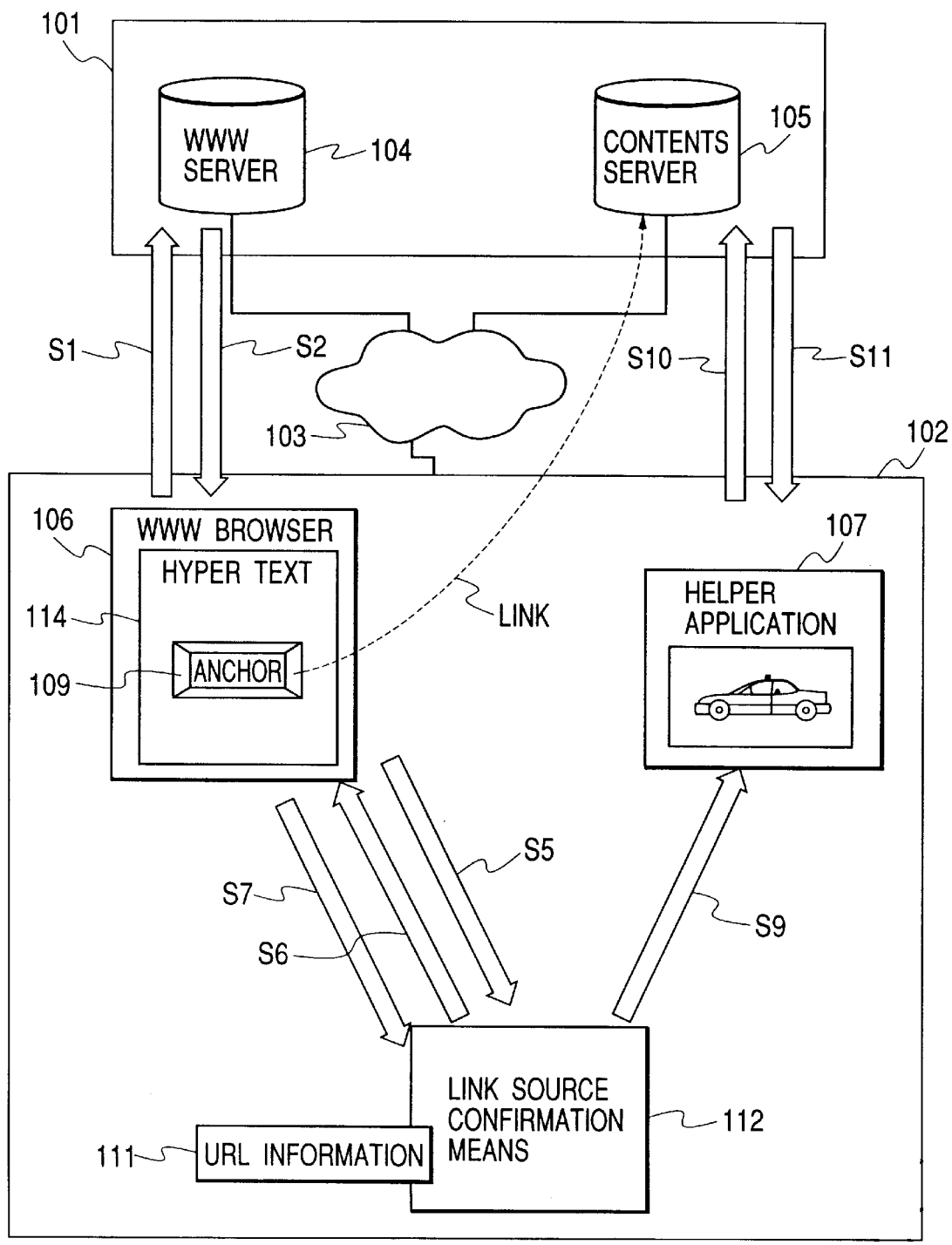
FIG. 1 is a block diagram showing a construction of a hyper text reading system according to the first embodiment of the invention.
Figure 2:
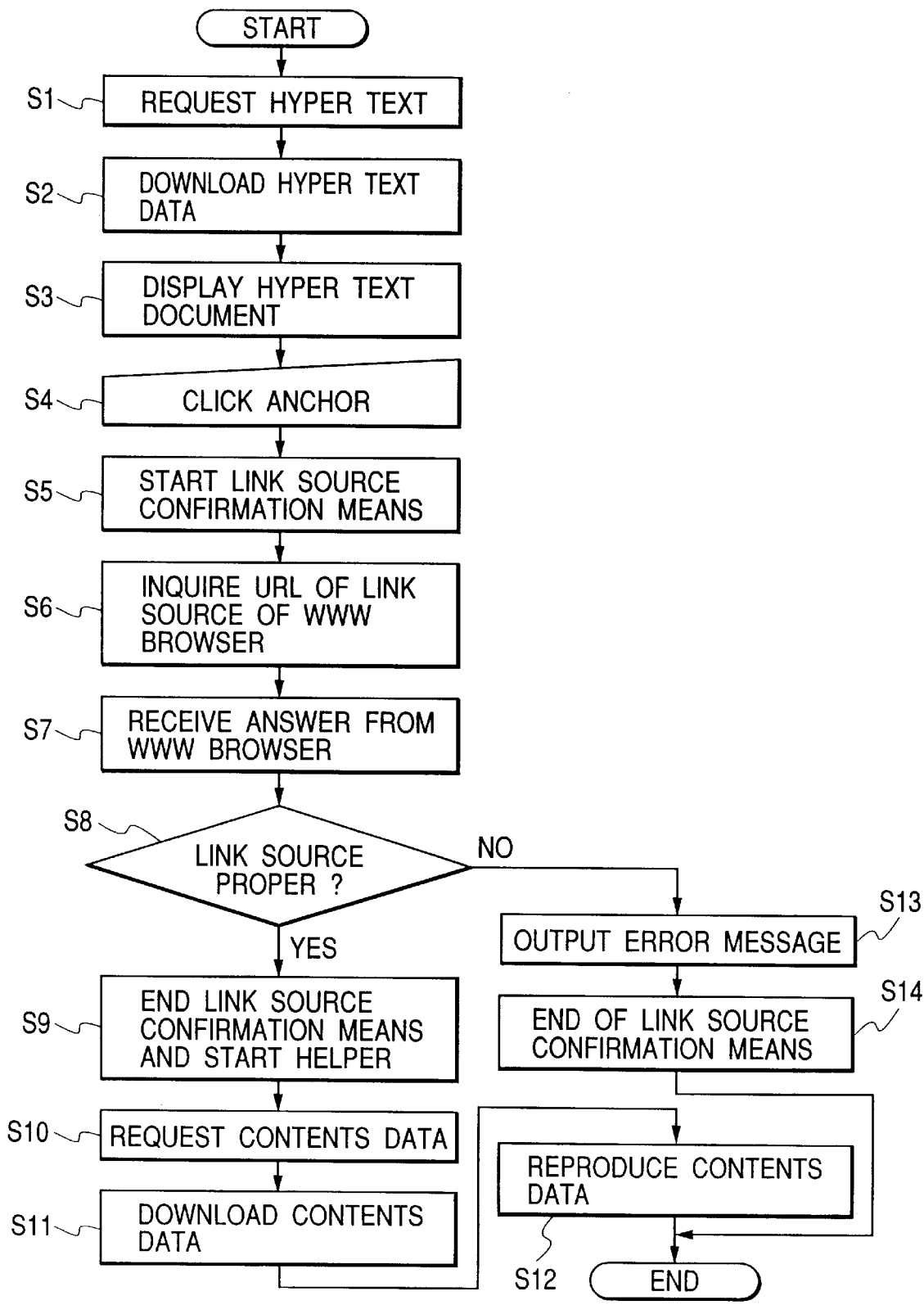
FIG. 2 is a flowchart showing a flow of processes of the hyper text reading system according to the first embodiment of the invention.

(a) First Embodiment:

The first embodiment of the invention will be first explained with reference to FIGS. 1 to 3. FIG. 1 is a block diagram showing a construction of a hyper text reading system according to the first embodiment of the invention. FIG. 2 is a flowchart showing a flow of processes of the hyper text reading system according to the first embodiment of the invention.

In FIG. 1, a case where hyper text information existing in a WWW server (computer) 104 provided in a site 101 of a contents provider connected to an internet 103 and video information existing in a contents server (computer) 105 are displayed by a computer 102 of an information reader through the internet 103 will be considered.

The contents server used here denotes a server in which multimedia data such as video information or audio information has been accumulated. The contents server can also operate on the same computer as that of the WWW server 104.

When the computer 102 of the information reader and the WWW server 104 in the site 101 of the contents provider are connected via the internet 103, the information reader requests the hyper text information existing in the WWW server 104 by operating a WWW browser 106 in step S1 in FIG. 2.

In step S2, the WWW server 104 transmits the hyper text information to the computer 102 of the information reader.

In step S3, the computer 102 of the information reader who received the hyper text information displays a hyper text 108 in the WWW browser 106. An anchor 109 which is linked to the video information accumulated in the contents server 105 is included in the hyper text 108.

When the information reader clicks the anchor 109 in step S4, the WWW browser 106 knows that a link destination of the anchor 109 is the video data accumulated in the contents server 105. In this instance, if the WWW browser 106 itself does not have a function to display its video image, link source confirmation means 112 is automatically activated in step S5.

In step S6, the link source confirmation means 112 inquires a URL (Uniform Resource Locator) of the hyper text 108 in which the anchor 109 which becomes a factor of the activation has been disclosed, namely, an address expression to specify the hyper text 108 to the WWW browser 106.

In step S7, the WWW browser 106 returns URL information (URL of the hyper text 108) 111 requested from the link source confirmation means 112 to the link source confirmation means 112.

In step S8, the link source confirmation means 112 discriminates whether the anchor 109 has been described in a proper page, namely, a page which is provided by the contents provider or not. The URL information 111 includes an address of a connection destination host computer of the WWW browser 106. An "address of the connection destination host computer of the WWW browser 106 which is obtained from the URL information 111" is compared with an "address of the contents server 105 serving as a link destination of the anchor 109". Usually, in many cases, the contents server 105 and WWW server 104 operate on the same computer. In this case, the link destination of the URL information 111 and that of the anchor 109 coincide. Therefore, when the link destination of the URL information 111 and that of the anchor 109 coincide, it is possible to determine that the link source is proper.

Figure 3:
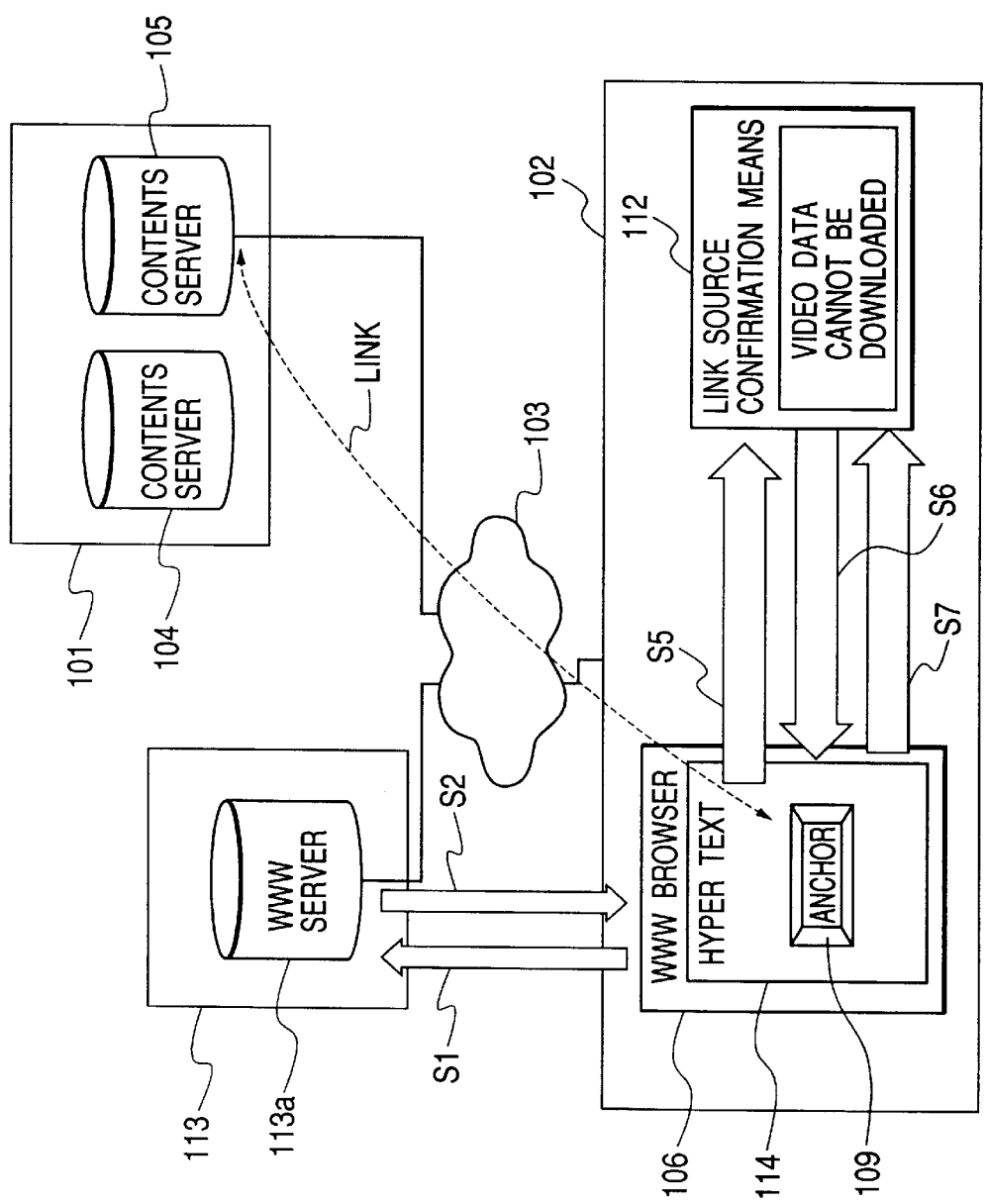
FIG. 3 is a block diagram showing the construction of the hyper text reading system according to the first embodiment of the invention.

If it is impossible to decide that the link source is proper, as shown in FIG. 3, an error message is generated in step S13. After that, the operation of the link source confirmation means 112 is finished, thereby preventing the contents data from being downloaded.

If it is possible to determine that the link source is proper, in next step S9, the operation of the link source confirmation means 112 is finished and a helper application 107 is activated.

In step S10, the helper application 107 requests contents data for the contents server 105. In step S11, the contents data is downloaded. In step S12, the downloaded contents data is displayed.

In addition to a cooperating process of the conventional WWW browser and helper application, by performing a link source confirming process (steps S5 to S8) by the link source confirmation means 112, it is possible to prevent that the helper application 107 is activated from any means other than the anchor 109 included in the hyper text prepared by the contents provider. For instance, as shown in FIG. 3, in the case where the anchor 109 which is linked to the contents data prepared by the contents provider is included in a hyper text 114 accumulated in a WWW server (computer) 113a provided for a WWW site 113 of the third party, the link source confirmation means 112 determines that the link source of the anchor 109 is improper, so that it does not request the contents data to the contents server 105.

Figure 4:
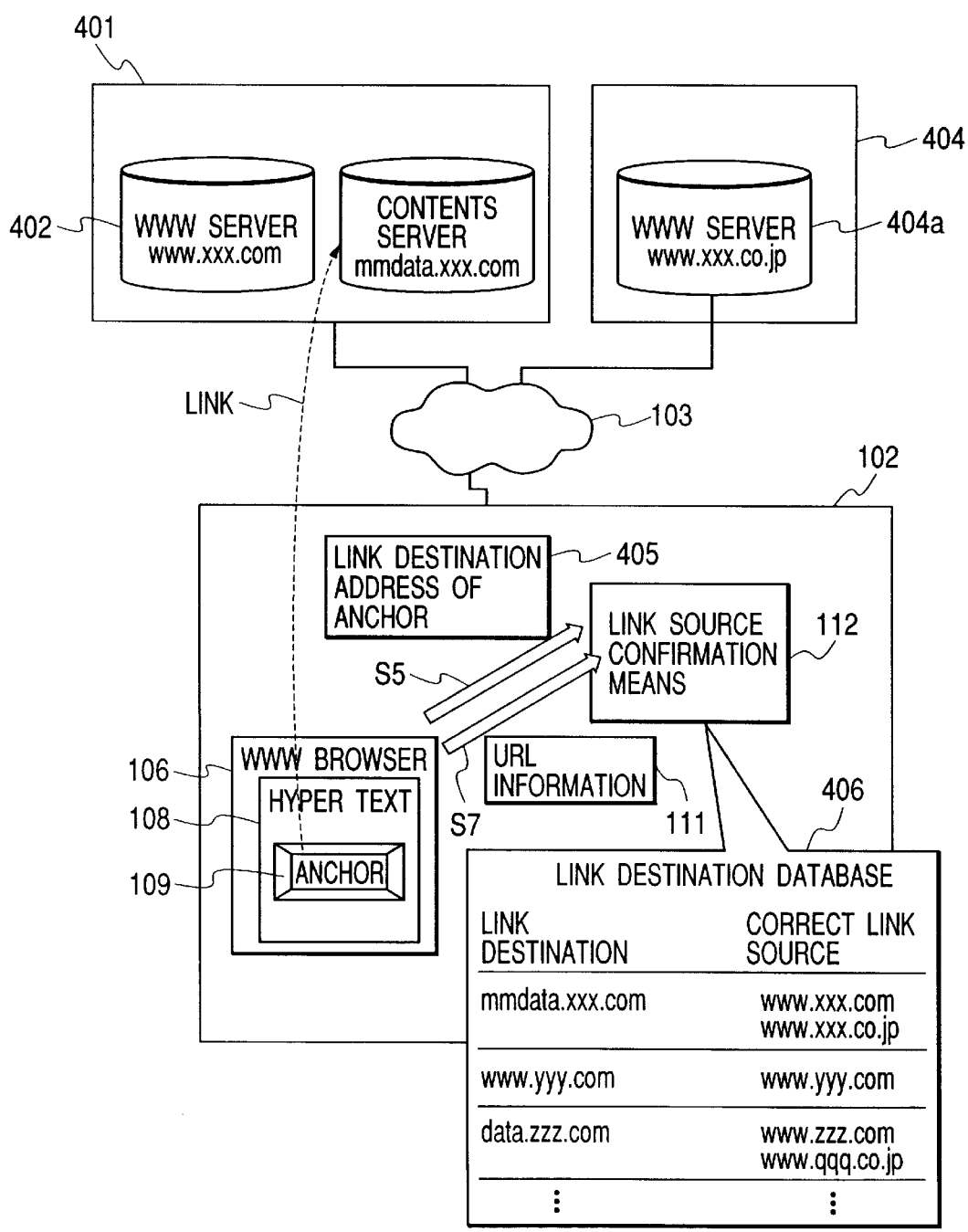
FIG. 4 is a block diagram showing a construction of a hyper text reading system according to the second embodiment of the invention.

(b) Second Embodiment:

The second embodiment of the invention will now be described with reference to FIG. 4. FIG. 4 is a block diagram showing a construction of a hyper text reading system according to the second embodiment of the invention.

In the foregoing first embodiment, explanation has been made with respect to the case where the URL information 111 and the address of the contents server 105 serving as a link destination of the anchor 109 are compared as means for discriminating whether the link source is proper or not in step S8 in FIG. 2. When the contents server 105 and WWW server 104 operate on the same computer, this method is effective. However, if the contents server 105 and WWW server 104 operate on different computers and network addresses are different, the above method cannot be applied.

In the embodiment, as shown in FIG. 4, a corresponding database 406 of the "link destination of the activated anchor" and the "correct link source" is stored in the link source confirmation means 112. In step S8 in FIG. 2, a check is made to see if a set of the URL information 111 of the anchor 109 received from the WWW browser 106 and a link destination 405 of the anchor 109 coincides with the description of the corresponding database 406, so that whether the link source of the anchor 109 is proper or not can be discriminated.

For instance, there is considered a case where a WWW server 402 provided for a site 401 of the contents provider in FIG. 4 operates on a computer of an address "www.xxx.co.jp" and a contents server 403 similarly provided for the site 401 of the contents provider operates on a computer of an address "mmdata.xxx.com". When the contents provider wants to permit the reference to the video data existing in the contents server 403 of "mmdata.xxx.com" for only links from the hyper texts stored in the WWW server 402 of "www.xxx.com" and a WWW server 404a of "www.xxx.co.jp" provided for a site 404 which is recognized as being correct by the contents provider, a correspondence as shown in the first row in the corresponding database 406 is previously stored in the link source confirmation means 112 in FIG. 1.

In step S8 in FIG. 2, the link destination address 405 of the anchor 109 and an address obtained from the URL information 111 obtained in step S7 are collated with a table of the corresponding database 406 in FIG. 4. Now, assuming that the link destination 405 of the anchor 109 is "mmdata.xxx.com", if the address obtained from the URL information 111 lies within a range from "www.xxx.com" to "www.xxx.co.jp", the link is determined to be correct and processes in step S9 and subsequent steps are executed. If NO, however, the link is decided to be improper and processes in step S13 and subsequent steps in FIG. 2 are executed.

With this method, the process to confirm the link source can be performed even when the WWW server 402 and contents server 403 operate on different computers.

Figure 5:
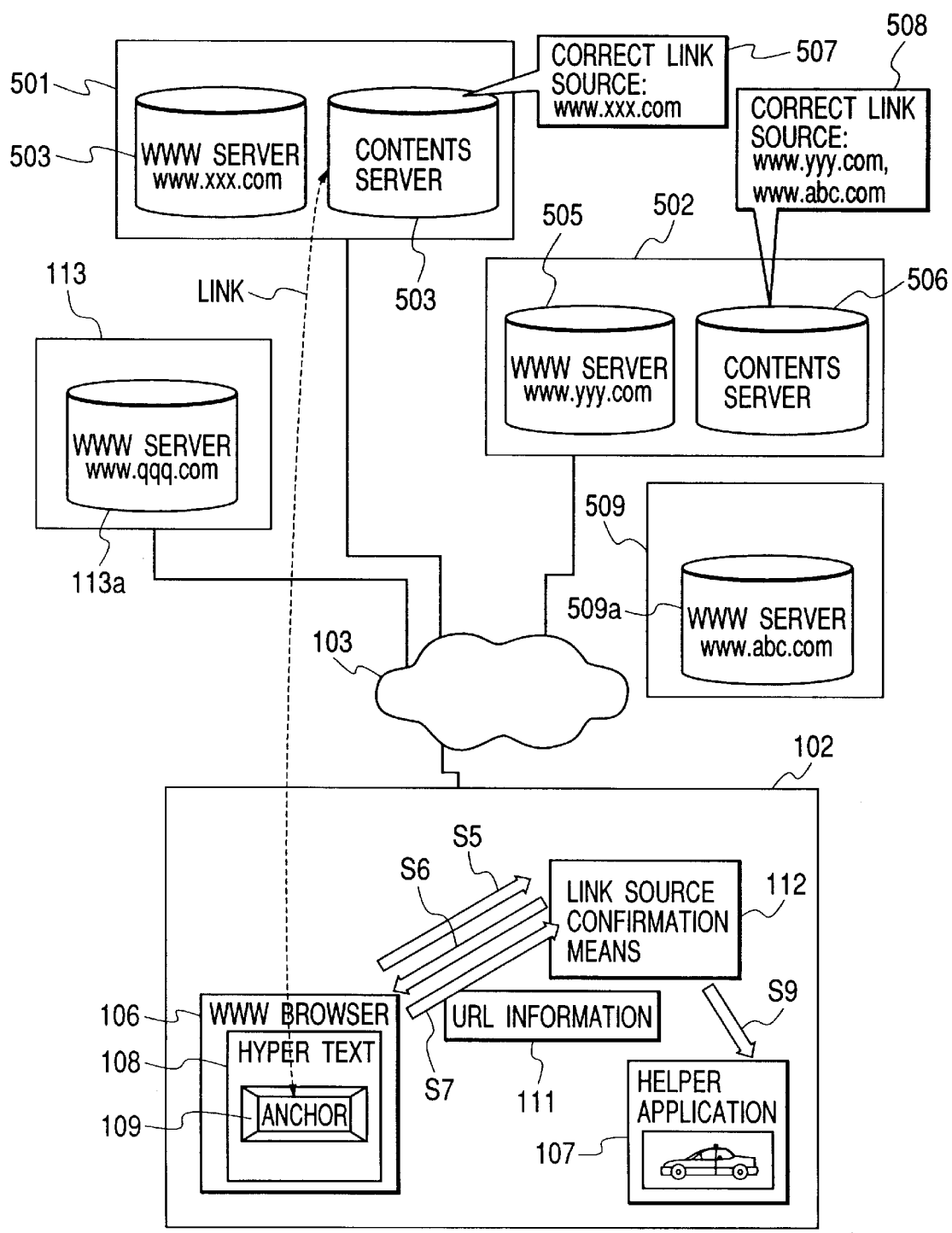
FIG. 5 is a block diagram showing a construction of a hyper text reading system according to the third embodiment of the invention.

(c) Third Embodiment:

The third embodiment of the invention will now be described with reference to FIG. 5. FIG. 5 is a block diagram showing a construction of a hyper text reading system according to the third embodiment of the invention.

In the foregoing second embodiment, as means for confirming the link destination and the link source of the anchor 109, the corresponding database 406 is provided in the link source confirmation means 112.

According to this method, however, when a plurality of contents servers exist on the network 103, there is a difficulty such that it is necessary to form the corresponding database 406 for all of the contents server on the network 103. Moreover, it will be obviously understood that it is difficult to adaptively update the corresponding database 406 for an information source of the internet 103 which successively changes.

According to the embodiment, when there are a plurality of contents servers on the network 103, a proper link source is stored every contents server and the link source confirmation means 112 inquires the proper link source to the contents server at the time of activation.

By this method, there is no need to provide the databases of the link destination and link source into the link source confirmation means 112. Even if the number of contents servers increases or address information or the like changes, the data does not need to be updated in the link source confirmation means 112. It is possible to adaptively cope with a dynamic change of the system.

As shown in FIG. 5, there is considered a case where a plurality of contents providers uniquely manage WWW sites 501 and 502 and information is provided in the respective sites 501 and 502 by using WWW servers (computers) 503 and 505 and contents servers (computers) 504 and 506.

As correct link source information 507, an address "www.xxx.com" of the WWW server 503 has been stored in the contents server 504.

In the computer 102 of the information reader, the link source confirmation means 112 is activated when the user clicks the anchor 109 included in the hyper text downloaded from "www.xxx.com".

The link source confirmation means 112 inquires the link source of the anchor 109 to the WWW browser 106, so that the URL information 111 of the link source of the anchor 109 is obtained.

To discriminate whether it is proper or not, the contents server 504 on the link destination side shown by the anchor 109 is inquired. If a host name included in the URL information 111 coincides with the correct link source information 507 accumulated in the contents server 504, the link source confirmation means 112 activates the helper application 107 and starts to download the contents data. If the host name included in the URL information 111 does not coincide with the correct link source information 507 accumulated in the contents server 504, the link source confirmation means 112 does not activate the helper application 107 but the processing operation is finished.

As a procedure to confirm the link source, the correct link source information 507 is downloaded from the contents server 504 and the link source confirmation means 112 can discriminate. Or, it is also possible to use a method whereby the link source confirmation means 112 uploads the URL information 111 to the contents server 504 and the contents server 504 makes a discrimination and transmits a discrimination result to the link source confirmation means 112.

As correct link sources, WWW servers "www.yyy.com" and "www.abc.com" have been registered in the other contents server 506. If the link source of the anchor 109 is those two servers, the helper application 107 can download the contents data from the contents server 506.

If the anchor 109 which is linked to the contents server 504 or 506 is included in the hyper text downloaded from the WWW server (computer) 113 of the third party which is not described as a correct link source in any one of the contents servers 504 and 506, even if it is clicked and the helper application 107 is activated, the link source URL of the anchor 109 and the correct link source information accumulated in each contents server are different, so that the video data cannot be downloaded.

Figure 6:
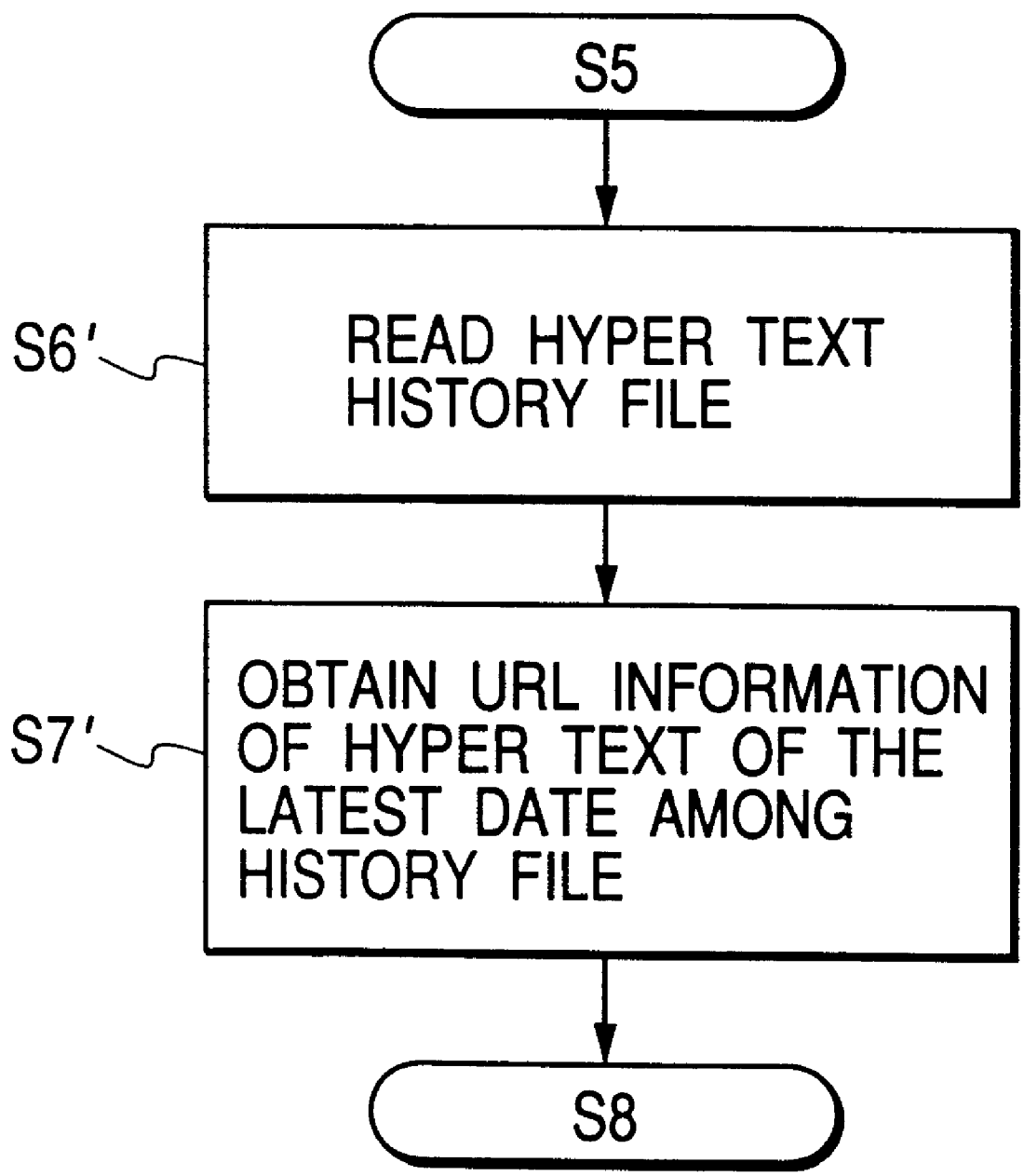
FIG. 6 is a flowchart showing a flow of processes of the hyper text reading system according to the fourth embodiment of the invention.
Figure 7:
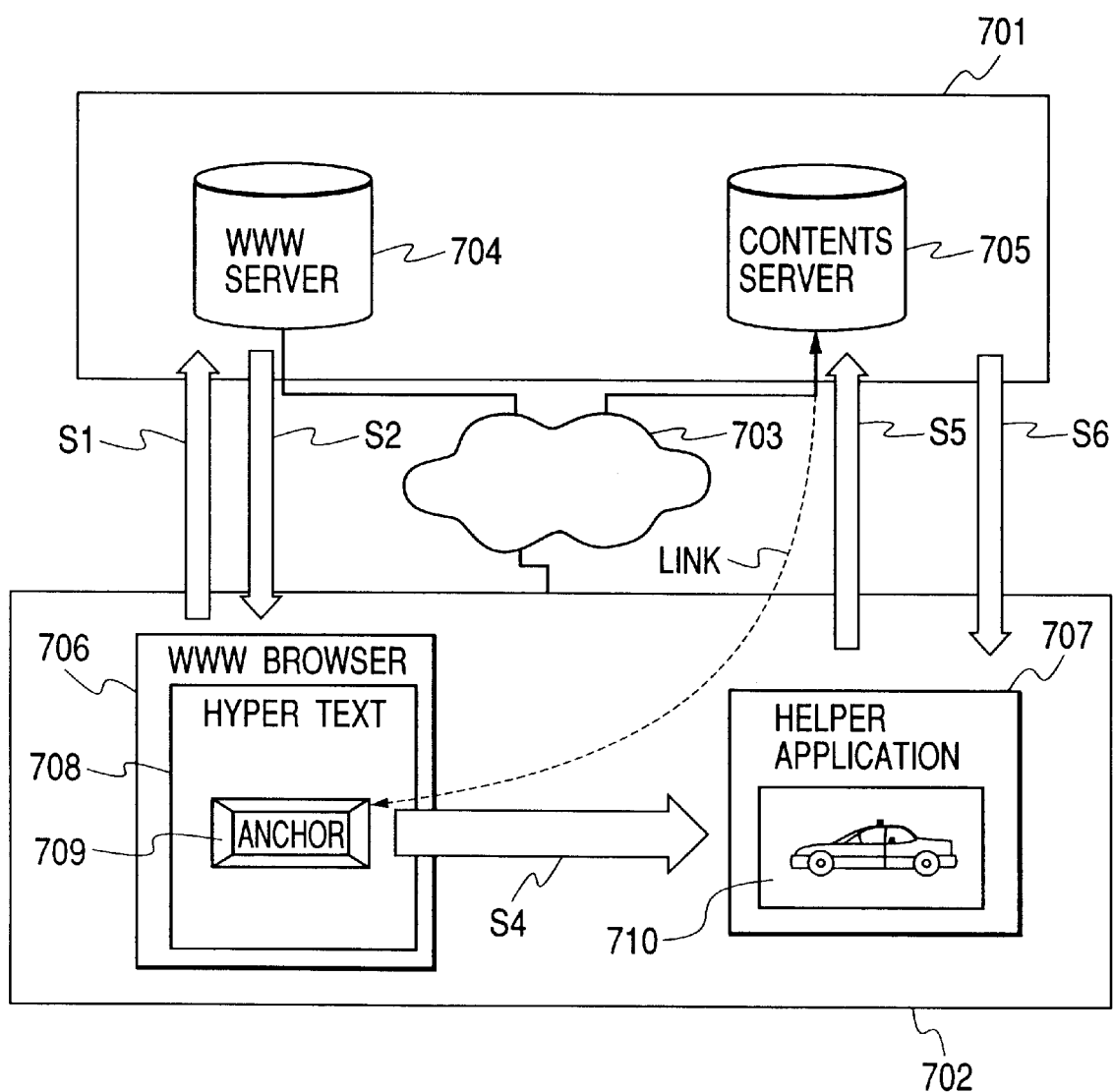
FIG. 7 is a block diagram showing a construction of a conventional hyper text reading system.
Figure 8:
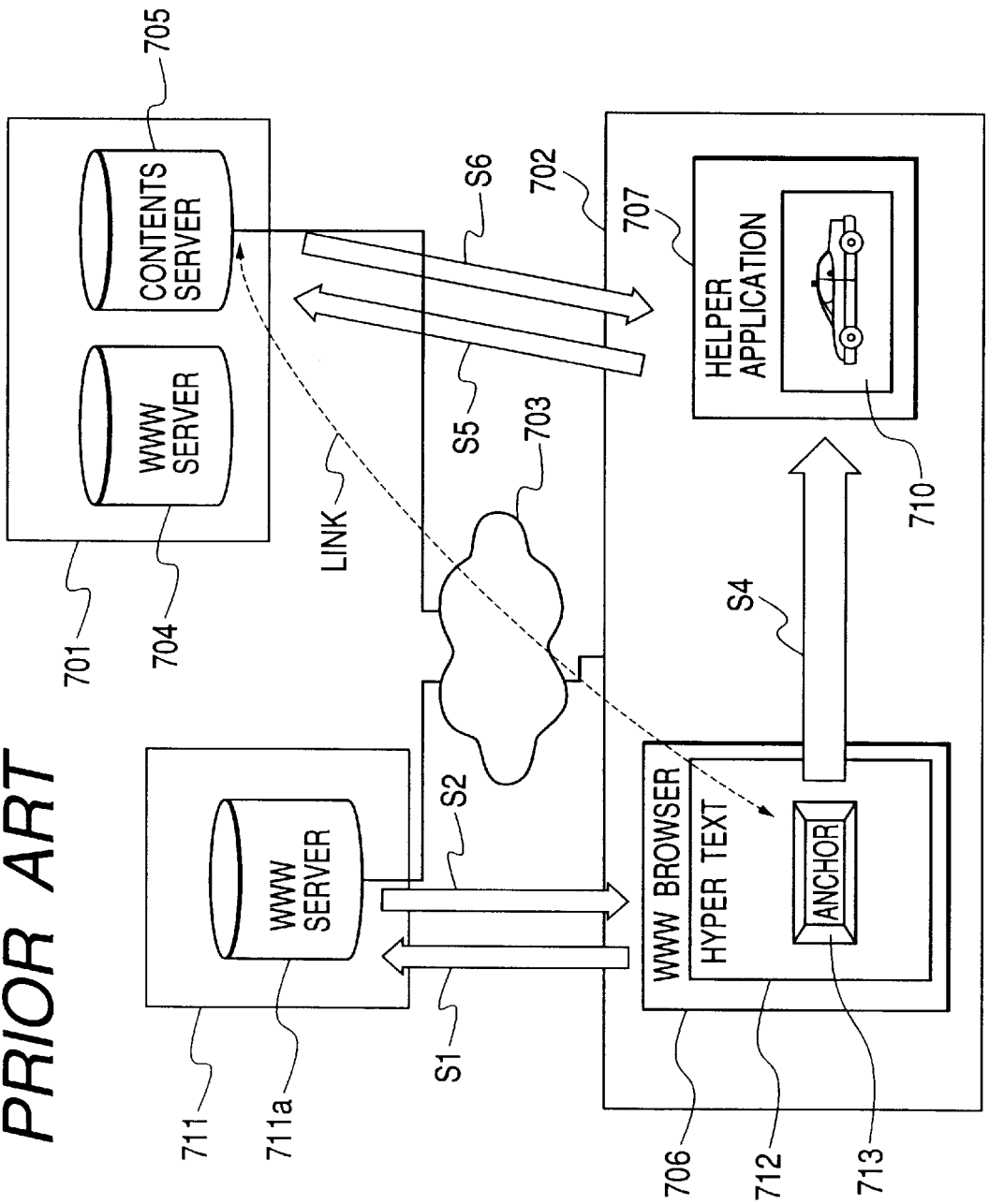
FIG. 8 is a diagram for explaining problems in the conventional hyper text reading system.

(d) Fourth Embodiment:

The fourth embodiment of the invention will now be described with reference to FIG. 6. FIG. 6 is a flowchart showing a part of a flow of processes of a hyper text reading system according to the fourth embodiment of the invention in FIG. 6.

In the foregoing first embodiment, after the link source confirmation means 112 was activated in step S5 in FIGS. 1 and 2, the link source confirmation means 112 inquires the URL of the hyper text in which the anchor 109 which became a factor of the activation has been disclosed for the WWW browser 106 in steps S6 and S7.

However, when the WWW browser 106 itself does not have a function to respond to an inquiry from an external application, since the above processes cannot be performed, a necessity to change the function itself of the WWW browser 106 occurs.

In place of inquiring to the WWW browser 106 from the link source confirmation means 112, a method of using a history file which is formed by the WWW browser 106 is considered.

The history file is a file in which the URL of the hyper texts downloaded so far by the WWW browser 106 and dates and times of the accesses have been recorded. The standard WWW browser usually forms such a file and updates this file each time a hyper text is downloaded.

By reading out the data from the file, the URL information of the hyper text can be obtained without inquiring to the WWW browser 106 from the link source confirmation means 112.

In the embodiment, it is sufficient to change the processes in steps S6 and S7 in FIGS. 1 and 2 in the first embodiment to processes as shown in steps S6' and S7' in FIG. 6.

After the link source confirmation means 112 was activated by the WWW browser 106 in step S5, a history file which is formed by the WWW browser 106 is read in step S6'. In step S7', the link source confirmation means 112 refers to the read history file, obtains a URL of the hyper text of the latest date, and uses it as URL information 111. After that, whether the link source is correct or not is discriminated in step S8.

As mentioned above, by changing the processes in the first embodiment as shown in the embodiment, the URL information can be obtained without changing the WWW browser.

According to the hyper text reading system of the embodiment as described in detail above, the means for confirming the link source of the anchor included in the hyper text is provided between the WWW browser and the helper application, so that the contents data can be referred from only the anchor in the hyper text prepared by the contents provider.

Therefore, the contents data cannot be referred from the anchor included in the hyper text which is provided by the third party which is not concerned with the contents provider. There are advantages such that an advantage can be assured while protecting the right of the contents provider.

What is claimed is:

1. A hyper text reading system in a database system of a client/server type constructed by a server and clients, wherein said server comprises:
hyper text providing means for providing a hyper text, and
multimedia data providing means for providing multimedia data, wherein said client comprises:
hyper text receiving means for receiving a desired hyper text of a user,
hyper text display means for displaying the hyper text received by said hyper text receiving means,
multimedia data receiving means for receiving the multimedia data from said server when an anchor in the hyper text displayed by said hyper text display means is selected by said user, and
multimedia data output means for generating the multimedia data received by said multimedia data receiving means, and wherein said multimedia data receiving means comprises:
discriminating means for discriminating whether or not a data request from the hyper text presently displayed by said hyper text display means to a link destination of the anchor selected by said user is permitted on a basis of the link destination and URL of the presently displayed hyper text, and
limiting means for limiting the reception of the multimedia data from said server on a basis of a discrimination result by said discriminating means.

2. A system according to claim 1, wherein said discriminating means determines that the data request from the presently displayed hyper text to the link destination of said anther is permitted when the URLs of the link destination and the presently displayed hyper text coincide.

3. A hyper text reading system in a database system of a client/server type comprising a plurality of servers and clients,
wherein a first server has hyper text providing means for providing a hyper text,
a second server has multimedia data providing means for providing multimedia data, wherein said client comprises:
hyper text receiving means for receiving a desired hyper text of a user,
hyper text display means for displaying the hyper text received by said hyper text receiving means,
multimedia data receiving means for receiving the multimedia data from said second server when an anchor in the hyper text displayed by said hyper text display means is selected by said user, and
multimedia data output means for generating the multimedia data received by said multimedia data receiving means, and
wherein said multimedia data receiving means comprises:
discriminating means for discriminating whether or not a data request from the hyper text presently displayed by said hyper text display means to a link destination of the anchor selected by said user is permitted on a basis of the link destination and URL of the presently displayed hyper text, and
limiting means for limiting the reception of the multimedia data from said server on a basis of a discrimination result by said discriminating means.

4. A system according to claim 3, wherein said client has memory means for storing proper link source information in correspondence with each of link destination information, and
said discriminating means determines that the data request from the presently displayed hyper text to the link destination of said anchor is permitted when the URL of the presently displayed hyper text coincides with the proper link source information stored in said memory means in correspondence with the link destination of said anchor.

5. A system according to claim 3, wherein
said second server has memory means for storing proper link source information, and
said discriminating means comprises:
link source information receiving means for receiving said proper link source information stored in said memory means of said second server corresponding to said link destination of the selected anchor; and
link source confirmation means for confirming that the data request from the presently displayed hyper text to the link destination of said anchor is permitted when the URL of the presently displayed hyper text coincides with said proper link source information.

6. A system according to claim 4 or 5, wherein said discriminating means obtains the URL information of the presently displayed hyper text with reference to a history of the hyper text displayed by said hyper text display means.

7. A system according to claim 3, wherein
said discriminating means comprises link source information sending means for sending URL information of the presently displayed hyper text to said second server, and
said second server has memory means for storing proper link source information and determination means, and said determination means comprises:
link source confirmation means for confirming that the data request from the presently displayed hyper text to the link destination of said anchor is permitted when the URL of the presently displayed hyper text coincides with said proper link source information stored in said memory means of said second server.

8. A system according to claim 1 or 3, wherein said hyper text is a document or data which was linked for the purpose of adding a detailed description or related information for a certain document or wordings of the document.

9. A system according to claim 1 or 3, wherein said multimedia data is data of an image, audio, video, or the like.

10. A system according to claim 1 or 3, wherein said anchor is a spot which is linked to another document or data existing in the hyper text.

11. A hyper text reading apparatus comprising:
hyper text receiving means for receiving a desired hyper text of a user;
hyper text display means for displaying the hyper text received by said hyper text receiving means;
multimedia data receiving means for receiving multimedia data from a server on a link destination side of an anchor in the hyper text displayed by said hyper text display means when said anchor is selected by said user; and
multimedia data output means for generating the multimedia data received by said multimedia data receiving means,
wherein said multimedia data receiving means has discriminating means for discriminating whether or not a data request from the hyper text presently displayed by said hyper text display means to a link destination of the anchor selected by said user is permitted on a basis of the link destination and URL of the presently displayed hyper text, and
limiting means for limiting the reception of the multimedia data from said server on a basis of a discrimination result by said discriminating means.

12. An apparatus according to claim 11, wherein said discriminating means
determines that the data request from the presently displayed hypes text to the link destination of said anchor is permitted when the URLs of the link destination and the presently displayed hyper text coincide.

13. A hyper text reading apparatus comprising:
hyper text receiving means for receiving a desired hyper text receiving means for receiving a desired hyper text of a user;
hyper text display means for displaying the hyper text received by said hyper text receiving means;
multimedia data receiving means for receiving multimedia data from a server on a link destination side of an anchor when the anchor in the hyper text displayed by said hyper text display means is selected by said user; and
multimedia data output means for generating the multimedia data received by said multimedia data receiving means,
wherein said multimedia data receiving means has discriminating means for discriminating whether or not a data request from the hyper text presently displayed by said hyper text display means to a link destination of the anchor selected by said user is permitted on a basis of the link destination and URL of the presently displayed hyper text, and
limiting means for limiting the reception of the multimedia data from said server on a basis of a discrimination result by said discriminating means.

14. An apparatus according to claim 13, further having memory means for storing a pair of proper link source information and link destination information, and wherein said discriminating means determines that the data request from the presently displayed hyper text to the link destination of said anchor is permitted when the URL of the link destination and the presently displayed hyper text coincide.

15. An apparatus according to claim 13, wherein said discriminating means determines that the data request from the presently displayed hyper text to the link destination of said anchor is permitted when the URLs of the link destination and the presently displayed hyper text coincide.

16. An apparatus according to claim 14 or 15, wherein said discriminating means obtains the URL information of the presently displayed hyper text with reference to a history of the hyper text displayed by said hyper text display means.

17. A hyper text reading method comprising:

a hyper text receiving step of receiving a desired hyper text of a user;

a hyper text displaying step of displaying the hyper text received by said hyper text receiving step;

a multimedia data receiving step of receiving multimedia data from a server on a link destination side of an anchor in the hyper text displayed by said hyper text displaying step when said anchor is selected by said user; and a multimedia data outputting step of generating the multimedia data received by said multimedia data receiving step, wherein said multimedia data receiving step has a discriminating step of discriminating whether or not a data request from the hyper text presently displayed by said hyper text displaying step to a link destination of the anchor selected by said user is permitted on a basis of the link destination and URL of the presently displayed hyper text, and a limiting step of limiting the reception of the multimedia data from said server on a basis of a discrimination result in said discriminating step.

18. A method according to claim 17, wherein said discriminating step determines that the data request from the presently displayed hyper text to the link destination of said anchor is coincide permitted when the URLs of the link destination and the presently displayed hyper text.

19. A hyper text reading method comprising:

a hyper text reading method comprising:

a hyper text receiving step of receiving a desired hyper text of a user;

a hyper text displaying step of displaying the hyper text received by said hyper text receiving step;

a multimedia data receiving step of receiving multimedia data from a server on a link destination side of an anchor in the hyper text displayed in said hyper text displaying step when said anchor is selected by said user, and a multimedia data outputting step of generating the multimedia data received by said multimedia data receiving step, wherein said multimedia data receiving step has a discriminating step of discriminating whether or not a data request from the hyper text presently displayed by said hyper text displaying step to a link destination of the anchor selected by said user is permitted on a basis of the link destination and URL of the presently displayed hyper text, and a limiting step of limiting the reception of the multimedia data from said server on a basis of a discrimination result in said discriminating step.

20. A method according to claim 19, wherein said discriminating step determines that the data request from the presently displayed hyper text to the link destination of said anchor is permitted when the URLs of the link destination and the presently displayed hyper text coincide.

21. A method according to claim 19, wherein said discriminating step determines that the data request from the presently displayed hyper text to the link destination of said anchor is permitted when the URLs of the link destination and the presently displayed hyper text coincide.

22. A method according to claim 20 or 21, wherein in said discriminating step, the URL information of the presently displayed hyper text is obtained with reference to a history of the hyper text displayed by said hyper text displaying step.

23. A memory medium in which a computer program is stored, comprising:

a hyper text receiving module for receiving a desired hyper text of a user;

a hyper text display module for displaying said received hyper text;

a multimedia data receiving module for receiving multimedia data from a server on a link destination side of an anchor in said displayed hyper text when said anchor is selected by said user; and a multimedia data output module for generating said received multimedia data which has been stored, wherein said multimedia data receiving module includes:

a discriminating module for discriminating whether or not a data request from the hyper text presently displayed by said hyper text display module to a link destination of the anchor selected by said user is permitted on a basis of the link destination and the URL of the presently displayed hyper text, and a limiting module for limiting the reception of the multimedia data from said server on a basis of a discrimination result.

24. A memory medium in which a computer program is stored, comprising:

a hyper text receiving module for receiving a desired hyper text of the user;

a hyper text display module for displaying said received hyper text;

a multimedia data receiving module for receiving multimedia data from a server on a link destination side of an anchor in said displayed hyper text when said anchor is selected by said user; and a multimedia data output module for generating said received-multimedia data which has been stored, wherein said multimedia data receiving module includes a discriminating module for discriminating whether or not data request from the hyper text presently displayed by said hyper text display module to a link destination of the anchor selected by said user is permitted on a basis of the link destination and URL of the presently displayed hyper text, and a limiting module for limiting the reception of the multimedia data from said server on a basis of a discrimination result.

* * * * *

UNITED STATES PATENT AND TRADEMARK OFFICE
CERTIFICATE OF CORRECTION

PATENT NO. : 6,247,013 B1
DATED : June 12, 2001
INVENTOR(S) : Osamu Morimoto

It is certified that error appears in the above-identified patent and that said Letters Patent is hereby corrected as shown below:

<u>Title page,</u>
Item [56], References Cited, OTHER PUBLICATIONS,
After "Wu, Yi-Hung et al.," ""Idex" should read -- "Index --; and
After "McEneaney, John E.," "Reader Disadvantage" should read -- Readers Disadvantaged --.

<u>Column 6,</u>
Line 27, "an" should read -- the --.

<u>Column 7,</u>
Line 21, "next" should read -- the next --.

<u>Column 8,</u>
Line 49, "every" should read -- on every --.

<u>Column 11,</u>
Line 2, "anther" should read -- anchor --.

<u>Column 12,</u>
Line 41, "hypes" should read -- hyper --.

<u>Column 13,</u>
Line 44, "coincide permitted" should read -- permitted --;
Line 45, "text." should read -- text coincide. --; and
Line 47, line 47 should be deleted.

UNITED STATES PATENT AND TRADEMARK OFFICE
CERTIFICATE OF CORRECTION

PATENT NO. : 6,247,013 B1
DATED : June 12, 2001
INVENTOR(S) : Osamu Morimoto

It is certified that error appears in the above-identified patent and that said Letters Patent is hereby corrected as shown below:

Column 14,
Line 54, "received-multimedia" should read -- received multimedia --; and
Line 55, "includes" should read -- includes: --.

Signed and Sealed this

Twenty-sixth Day of March, 2002

Attest:

JAMES E. ROGAN
*Attesting Officer*      *Director of the United States Patent and Trademark Office*